US010536323B2

(12) United States Patent
Panigrahi et al.

(10) Patent No.: US 10,536,323 B2
(45) Date of Patent: Jan. 14, 2020

(54) ON-DEMAND FAULT REDUCTION FRAMEWORK

(71) Applicant: Accenture Global Solutions Limited, Dublin (IE)

(72) Inventors: Badarayan Panigrahi, Bangalore (IN); Gaurav Khanduri, Bangalore (IN); Sanjay Tiwari, Bangalore (IN); Nithyanandan Kandaswamy, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 147 days.

(21) Appl. No.: 15/788,854

(22) Filed: Oct. 20, 2017

(65) Prior Publication Data

US 2018/0152338 A1 May 31, 2018

(30) Foreign Application Priority Data

Nov. 25, 2016 (IN) .............................. 201641040364
Feb. 21, 2017 (EP) ..................................... 17157145

(51) Int. Cl.
*G06F 15/16* (2006.01)
*H04L 12/24* (2006.01)
*H04L 12/28* (2006.01)

(52) U.S. Cl.
CPC ...... *H04L 41/0631* (2013.01); *H04L 41/0654* (2013.01); *H04L 12/28* (2013.01); *H04L 41/12* (2013.01)

(58) Field of Classification Search
CPC ... H04L 29/08072; H04L 29/06; H04L 41/16; H04L 12/28; H04L 41/12
See application file for complete search history.

(56) References Cited

U.S. PATENT DOCUMENTS

| | | | |
|---|---|---|---|
| 6,748,432 B1 * | 6/2004 | Du ...................... | H04L 41/0604 709/224 |
| 7,043,661 B2 * | 5/2006 | Valadarsky ......... | H04L 41/0604 379/15.05 |
| 7,337,222 B1 * | 2/2008 | Du ......................... | H04L 12/28 709/223 |
| 10,153,950 B2 * | 12/2018 | Abdulnour .............. | H04L 41/16 |

(Continued)

*Primary Examiner* — Khanh Q Dinh
(74) *Attorney, Agent, or Firm* — Harrity & Harrity, LLP (57) ABSTRACT

A computer-implemented method for correlating alarms that are generated with relation to a computer network is disclosed. The alarms represent faults of the computer network and/or faults of components of the computer network. The computer-implemented method comprises: displaying, on a display device, a graphical user interface that allows a user to select a type of correlation between one or more alarms and a type of fault which causes the one or more alarms from among a plurality of types of correlation; receiving, via the graphical user interface, a user input indicating the type of correlation selected by the user; storing, in a database, at least one rule based on the selected correlation; receiving, by a server, a plurality of alarms generated with relation to the computer network; correlating, by a correlation engine, the plurality of alarms received by the server according to the at least one rule stored in the database to identify a fault which has caused the one or more alarms; and displaying, on the display device, the at least one identified fault.

20 Claims, 9 Drawing Sheets

(56) References Cited

U.S. PATENT DOCUMENTS

| | | | | |
|---|---|---|---|---|
| 2002/0111755 A1* | 8/2002 | Valadarsky | ......... | H04L 41/0604 |
| | | | | 702/58 |
| 2005/0166099 A1* | 7/2005 | Shyu | ................... | G06F 11/0709 |
| | | | | 714/47.1 |
| 2005/0276217 A1* | 12/2005 | Gadgil | ................ | H04L 41/0631 |
| | | | | 370/225 |
| 2015/0006459 A1* | 1/2015 | Lv | ............................ | G06N 5/04 |
| | | | | 706/47 |

\* cited by examiner

ON-DEMAND FAULT REDUCTION FRAMEWORK

RELATED APPLICATION

This application claims priority under 35 U.S.C. § 119 to Indian Patent Application No. 201641040364, filed on Nov. 25, 2016 and 35 U.S.C. § 119 to European Patent Application No. 17157145.8, filed on Feb. 21, 2017, the contents of which are incorporated by reference herein in their entirety.

TECHNICAL FIELD

The application relates to correlating alarms that are generated with relation to a computer network.

BACKGROUND

Alarm correlation is a conceptual interpretation of multiple alarms such that new meanings are assigned to these alarms. It is a generic process that underlies different network management tasks. Alarm correlation may be used for network fault isolation and diagnosis, selecting corrective actions, proactive maintenance, and trend analysis.

Subjects for correlation could be any events affecting the network. These may be environmental state parameters, the network management context, or events invoked by the user or external systems. Correlations may be defined over a time interval or window.

SUMMARY

On-Demand Fault Reduction Framework may be aimed at providing a Network Operation Center with a platform to design their own relationship between the alarms through front-end graphical user interface (GUI).

The present disclosure is directed to giving the end-user a platform to reduce incoming fault represented by an alarm into their fault management system so as to help them in effective monitoring of their complex network.

According to an aspect, a computer-implemented method for correlating alarms that are generated with relation to a computer network is provided. The alarms may represent faults of the computer network and/or faults of components of the computer network. The method may comprise the following: displaying, on a display device, a graphical user interface that allows a user to select a type of correlation between one or more alarms and a type of fault which causes the one or more alarms from among a plurality of types of correlation; receiving, via the graphical user interface, a user input indicating the type of correlation selected by the user; storing, in a database, at least one rule based on the selected correlation; receiving, by a server, a plurality of alarms generated with relation to the computer network; correlating, by a correlation engine, the plurality of alarms received by the server according to the at least one rule stored in the database to identify a fault which has caused the one or more alarms; and displaying, on the display device, the at least one identified fault.

In the various embodiments and examples described herein, the term "alarms that are generated with relation to a computer network" may be understood as including alarms that are generated within the computer network. For example, a component included in the computer network, such as a computer, a mobile device or a network router etc., may generate an alarm when a fault occurs at the component. Alternatively or additionally, the term "alarms that are generated with relation to a computer network" may be understood as including alarms that are generated by a system that is separate from the computer network and is monitoring the computer network.

In some examples, the method may further comprise: responsive to the correlation engine identifying the fault, transmitting a signal to rectify the fault.

In some examples, the method may further comprise: generating the at least one rule based on the selected correlation.

In some examples, the plurality of types of correlation may include one or more of the following: an aggregation based correlation where two or more alarms are aggregated into a single alarm for a node in the computer network or for a combination of a node and a port in the computer network; a suppression based correlation where one or more alarms are determined to be suppressed; a root cause analysis correlation where a parent alarm is determined to be displayed while one or more child alarms of the parent alarm are determined to be suppressed.

In the various embodiments and examples described herein, the term "node" may be understood as corresponding to one or more components of the computer network.

In some examples, the aggregation based correlation may comprise the following: identifying, among the rules stored in the database, one or more rules applicable for the plurality of alarms received by the server; determining, based on the one or more identified rules, whether the one or more identified rules are of Node based or of Node-Port based; if the one or more identified rules are of Node based, aggregating all alarms belonging to a same node of the computer network to form the single alarm; if the one or more identified rules are of Node-Port based, aggregating all alarms belonging to a same combination of a node and a port to form the single alarm.

In the various embodiments and examples described herein, the term "port" may be understood as indicating an interface between a computer and other computers or peripheral devices. For example, a first port of a first computer may be connected to a second port of a second computer. Accordingly, ports may establish physical connectivity between two devices. Alternatively or in addition, the term "port" may be understood as indicating an endpoint of communication in an operating system.

In some examples, the suppression based correlation may comprise the following: identifying, among the rules stored in the database, one or more rules applicable for the plurality of alarms received by the server; and if an alarm type of one of the plurality of alarms received by the server falls into a category defined in the one or more identified rules, determining said one of the plurality of alarms received by the server to be suppressed.

In the various embodiments and examples described herein, the alarms determined to be "suppressed" may be understood us alarms that are prevented from being displayed on a display device. In other words, "suppressed" alarms may be excluded from information to be displayed on the display device.

In some examples, the graphical user interface may include a dropdown menu showing the plurality of types of correlation for user selection.

In some examples, the computer-implemented method may further comprise displaying, on the display device, an input form based on the selected type of correlation, the input form allowing the user to enter correlation parameters required for execution of the selected type of correlation; and receiving the required correlation parameters entered by the user.

According to another aspect, a correlation system for correlating alarms that are generated with relation to a computer network is provided. The correlation system may comprise a database and a processor configured to perform the method according to any one of the aspect or examples as stated above.

According to yet another aspect, a computer-readable medium is provided. The computer-readable medium may store computer-readable instructions that, when loaded and run on a computer, cause the computer to perform the method according to any one of the aspect or examples as stated above.

According to yet another aspect, a graphical user interface is provided. The graphical user interface may be displayed for correlating alarms that are generated with relation to a computer network, wherein the alarms represent faults of the computer network and/or faults of components of the computer network. The graphical user interface may comprise the following: information that allows a user to select a type of correlation between one or more alarms and a type of fault which causes the one or more alarms from among a plurality of correlation, wherein the graphical user interface enables a processor to receive a user input indicating the type of correlation selected by the user, the processor being configured to perform the method according to any one of the aspect or examples as stated above.

The subject matter described in the application can be implemented as a method or as a system, possibly in the form of one or more computer program products. The subject matter described in the application can be implemented in a data signal or on a machine readable medium, where the medium is embodied in one or more information carriers, such as a CD-ROM, a DVD-ROM, a semiconductor memory, or a hard disk. Such computer program products may cause a data processing apparatus to perform one or more operations described in the application.

In addition, subject matter described in the application can also be implemented as a system including a processor, and a memory coupled to the processor. The memory may encode one or more programs to cause the processor to perform one or more of the methods described in the application. Further subject matter described in the application can be implemented using various machines.

BRIEF DESCRIPTION OF THE DRAWINGS

Details of one or more implementations are set forth in the example drawings and description below. Other features will be apparent from the description, the drawings, and from the claims. It should be understood, however, that even though embodiments are separately described, single features of different embodiments may be combined to further embodiments.

DETAILED DESCRIPTION

In the following text, a detailed description of examples will be given with reference to the drawings. It should be understood that various modifications to the examples may be made. In particular, elements of one example may be combined and used in other examples to form new examples.

Figure 1:
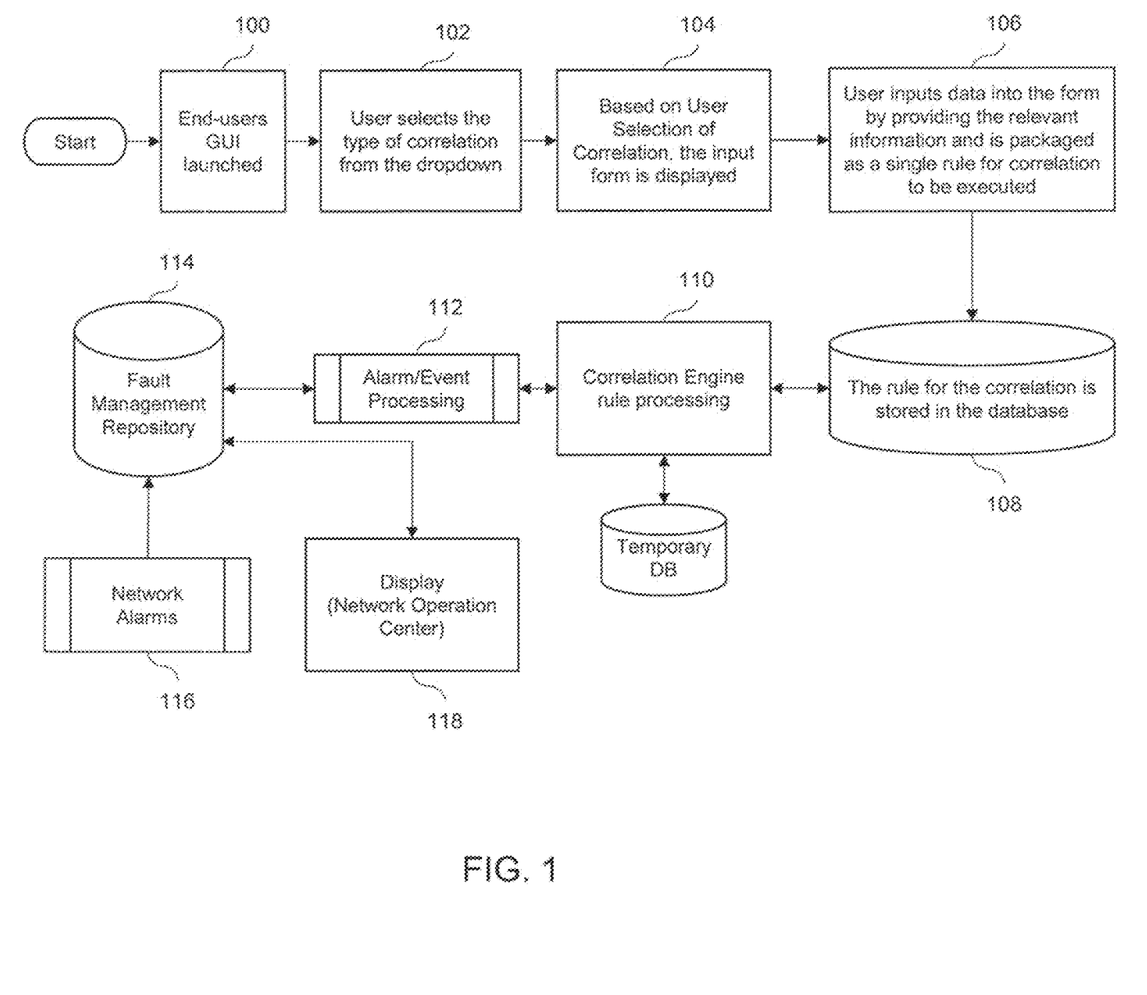
FIG. 1 shows an example end-to-end flow for On-Demand Fault Reduction Framework.

FIG. 1 shows an example end-to-end flow for On-Demand Fault Reduction Framework. In the framework, an end-user interface form may be provided (100). The end-user interface form may be a GUI which is launched from a server and is displayed on a display device. The end-user interface form may allow a user to select a type of correlation between one or more alarms and a type of fault which causes the one or more alarms from among a plurality of types of correlation (102). The plurality of types of correlation may include, but not be limited to, Aggregation, Suppression and Root Cause Analysis. Based on the user selection of the type of correlation, an input form may be displayed (104). The input form may allow the user to enter correlation parameters required for execution of correlation (106). The input form may be displayed either within or separately from the end-user interface form. Once the user enters the correlation parameters, the user may submit the input form by entering a predefined input. For example, the input form may include a button to "submit" the input form and the user may press the "submit" button with an input device such as a mouse or a keyboard. Then each of the submission may be packaged and stored as at least one rule in a database 108.

An alarm may include, for example, DNS (domain name system) name/opco name of the device for which the alarm is generated, IP (internet protocol) address, alarm type/alert group, first occurrence time stamp, last occurrence timestamp, problem/resolution type, class of alarm, summary, identifier unique to the alarm, count (number of occurrence), port or interface and/or domain/source of system that is monitored (e.g. when the alarm was first received). The alarm type/alert group may relate to a descriptive name of the failure type indicated by the alert, for example, interface status or CPU utilization, etc. The problem/resolution type may relate to the type of alarm, where the type may refer to the problem or resolution state of the alarm. The class of alarm may be used to identify the vendor from which the alert was generated, e.g., Cisco, Huawei, Juniper Networks etc. A fault management system may include one or more of the above-stated fields in an alarm. An alarm may further include one or more additional fields relating to, for example, platform dependent information and enriched information based on customer requirement.

When a network alarm enters the Fault Management Repository 114, the alarm/event processor 112 may forward the alarm into a correlation engine 110 where the correlation may be executed based on the conditions of the at least one rule applicable to the alarm/event. The correlation may be executed to identify a fault which has caused the alarm. The identified fault may be displayed on a display device.

Further, in particular circumstances, a signal to rectify the fault may be transmitted to relevant component(s) of the computer network.

Once the alarms are correlated, the correlated alarms may be sent back to the Fault Management Repository 114. The correlated alarms may be displayed in a Fault Management dashboard through Active Event List (AEL) or in an alarm display window of the Fault Management System (118).

Figure 2:
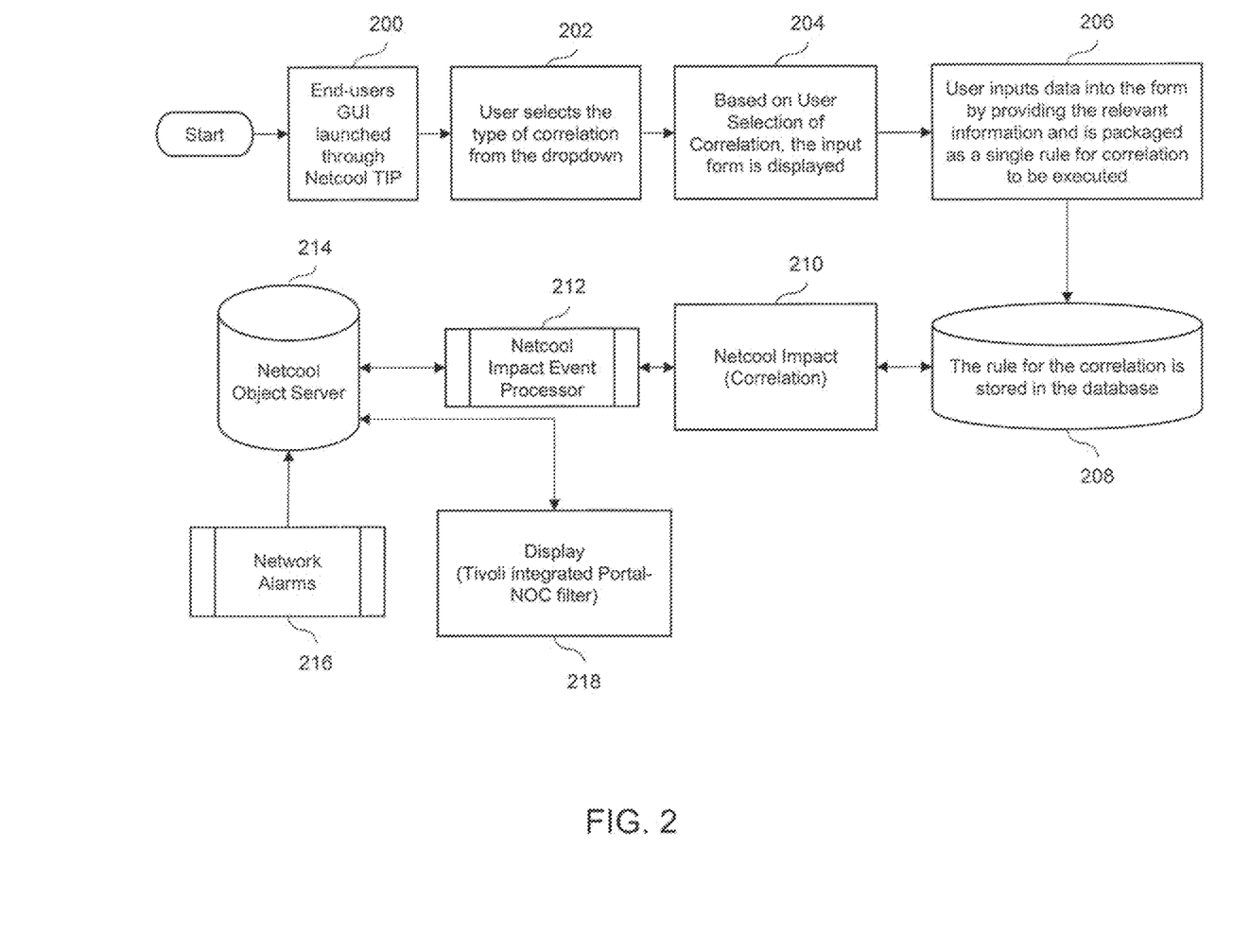
FIG. 2 shows another example end-to-end flow for On-Demand Fault Reduction Framework.

FIG. 2 shows an example end-to-end flow for an On-Demand Fault Reduction Framework. In the On-Demand Fault Reduction Framework, an end-user interface form may be provided (200). The end-user interface form may be a GUI launched from a Tivoli Integrated Portal (TIP) which is an integrated solutions platform for Tivoli (registered trademark of International Business Machines Corporation) products.

Figure 6A:
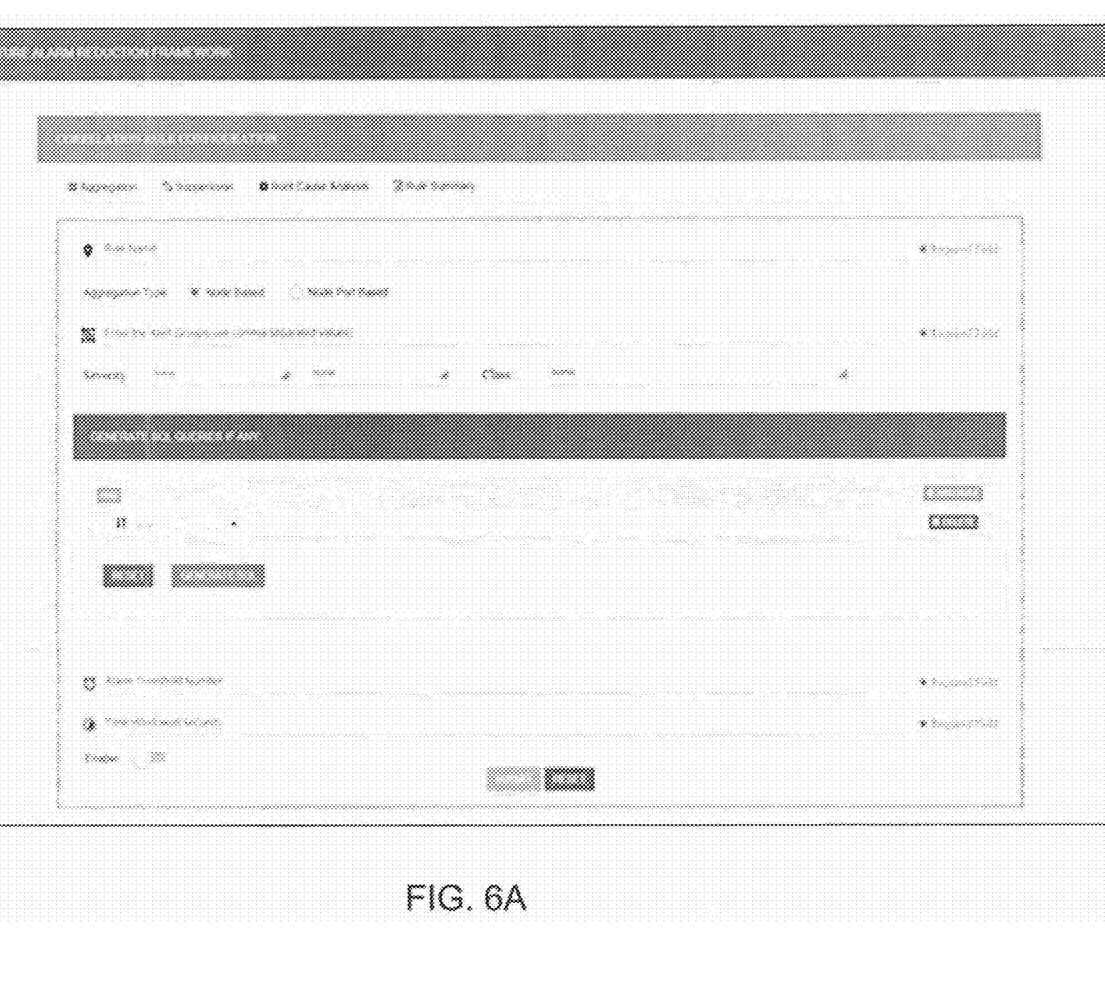
FIG. 6A shows an example GUI (graphical user interface) for configuring an aggregation correlation rule.
Figure 6B:
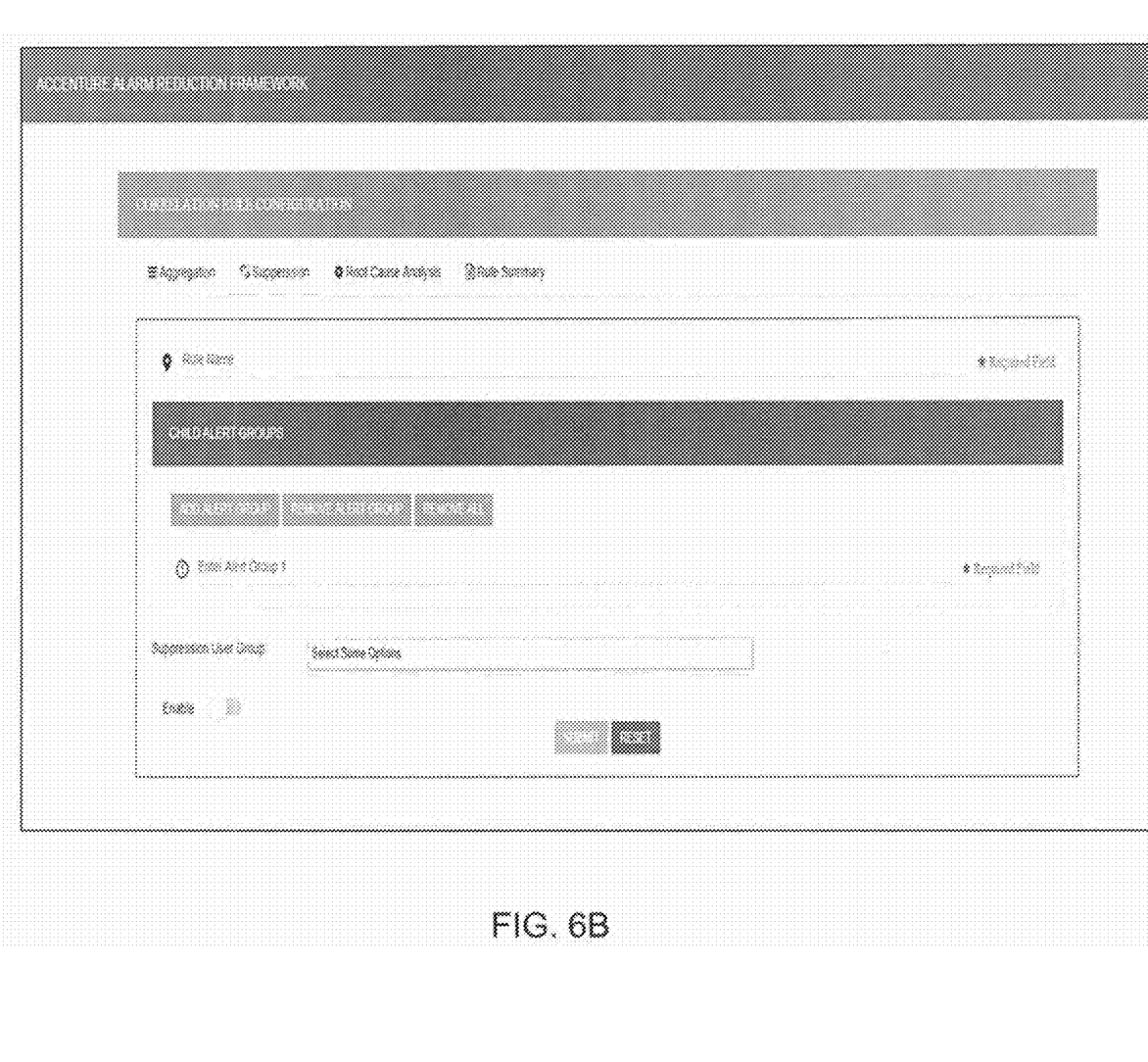
FIG. 6B shows an example GUI for configuring a suppression correlation rule.
Figure 6C:
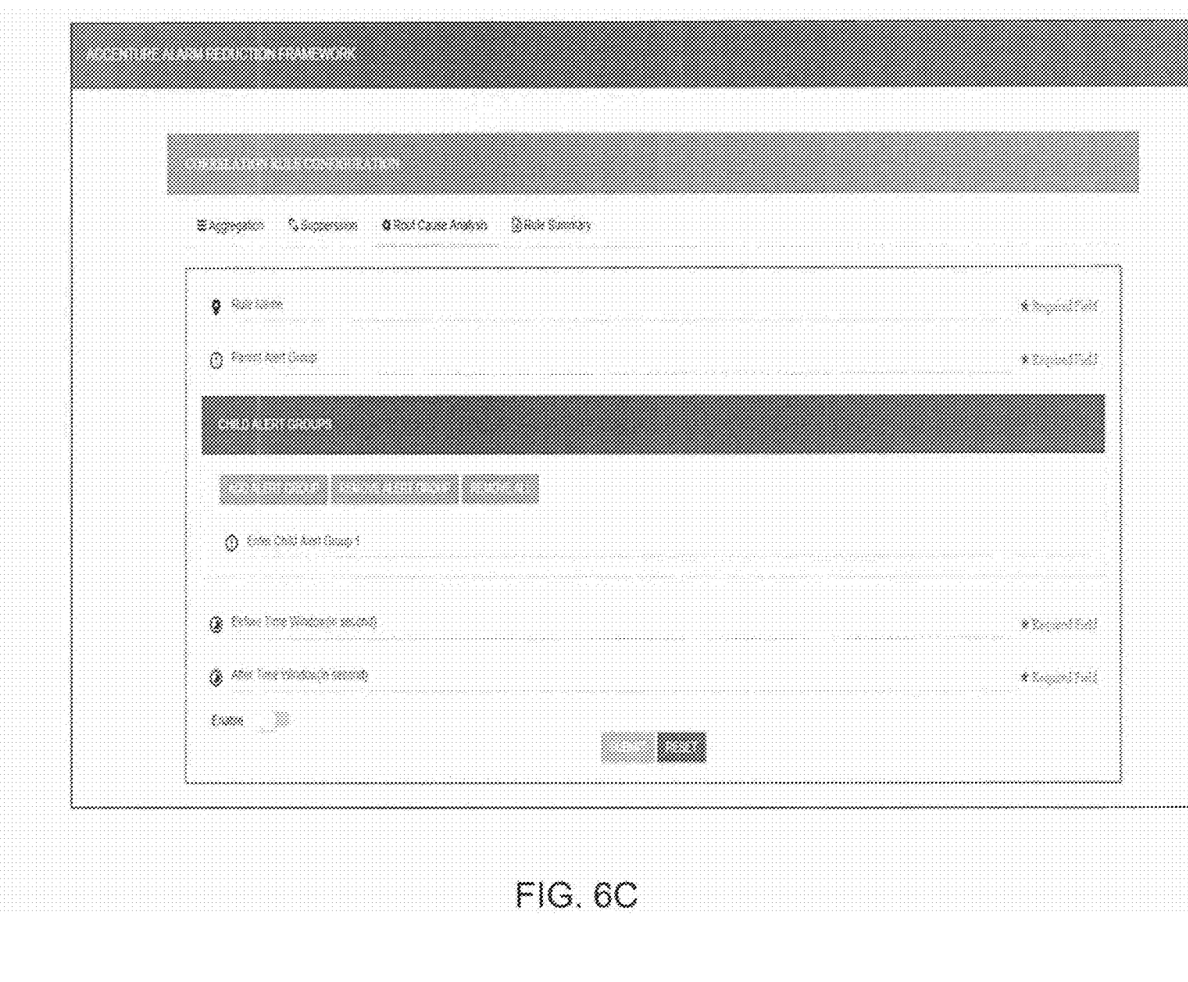
FIG. 6C shows an example GUI for configuring a root cause analysis correlation rule.

The end-user interface form may allow a user to select a type of correlation between one or more alarms and a type of fault which causes the one or more alarms from among a plurality of types of correlation (202). The plurality of types of correlation may include, but not be limited to, Aggregation, Suppression and Root Cause Analysis. Based on the user selection of the type of correlation, an input form may be displayed (204). The input form may allow the user to enter correlation parameters required for execution of correlation (206). FIGS. 6A, 6B and 6C show example GUIs which may implement the input forms for the Aggregation correlation, Suppression correlation and Root Cause Analysis correlation, respectively. The input form may be displayed either within or separately from the end-user interface form. Once the user enters the correlation parameters, the user may submit the input form by entering a predefined input. For example, the input form may include a button to "submit" the input form and the user may press the "submit" button with an input device such as a mouse or a keyboard. Then each of the submission may be packaged and stored as at least one rule in a database 208.

When a network alarm enters a Netcool (registered trademark of International Business Machines Corporation) Omnibus Object Server 214, an event processor 212 may forward the alarm into Netcool Impact 210 where the correlation may be executed based on the conditions of the at least one rule applicable to the alarm/event. The correlation may be executed to identify a fault which has caused the alarm. The identified fault may be displayed on a display device. Further, in particular circumstances, a signal to rectify the fault may be transmitted to relevant component(s) of the computer network.

Once the alarms are correlated, the correlated alarms may be sent back to the Netcool Omnibus Object Server 214. Then the alarms may be displayed in the Netcool TIP through Active Event List (AEL) (218).

As stated above, alarm correlation may be broadly classified into three categories or types:
  i) Aggregation.
  ii) Suppression.
  iii) Root Cause Analysis.

When a network device detects a fault or error within itself or relating to one of its elements or relating to links to another device or elements, the network device may generate an alarm message ("alarm" herein) and may send the alarm to a network management system. To enable the network management system to detect fault conditions as they occur (in other words, "in real time"), some network elements may be designed and configured to generate and send such alarms repeatedly, until the fault or other causative condition is resolved or acknowledged. Such network devices may be components of a computer network and may include routers, LAN switches, WAN switches, edge devices such as access routers, or other network elements, and system elements such as UNIX servers, etc. Although this approach may have the benefit of ensuring that alarms are known until they are resolved, it may also create certain management problems. Particularly, for an NOC (Network Operation Center) operator to uniquely identify the problem from a particular network element and entities e.g. Node or Node-Port combination, as there may be flood of alarms into the NOC monitoring filter. The Aggregation of alarms may be advantageous in such a circumstance. In an aggregation based correlation, alarms may be correlated based on Node or Node-Port combination within a particular given time window and taking into account the count of alarms e.g. threshold received into the network management system.

In aggregation based correlation, the approach may be divided into two parts, for example: Node Based aggregation and Node-Port Based aggregation of alarms. In Node Based aggregation, multiple alarms may be aggregated into a single Node alarm based on alarm type, class of alarms, severity of the alarms and/or user-provided SQL condition. Similarly, in case of Node-Port Based aggregation, multiple alarms from a Node and an interface or port may be aggregated into a single alarm based on alarm type, class of alarms, severity of alarms and/or any other SQL condition provided by the user.

Figure 3:
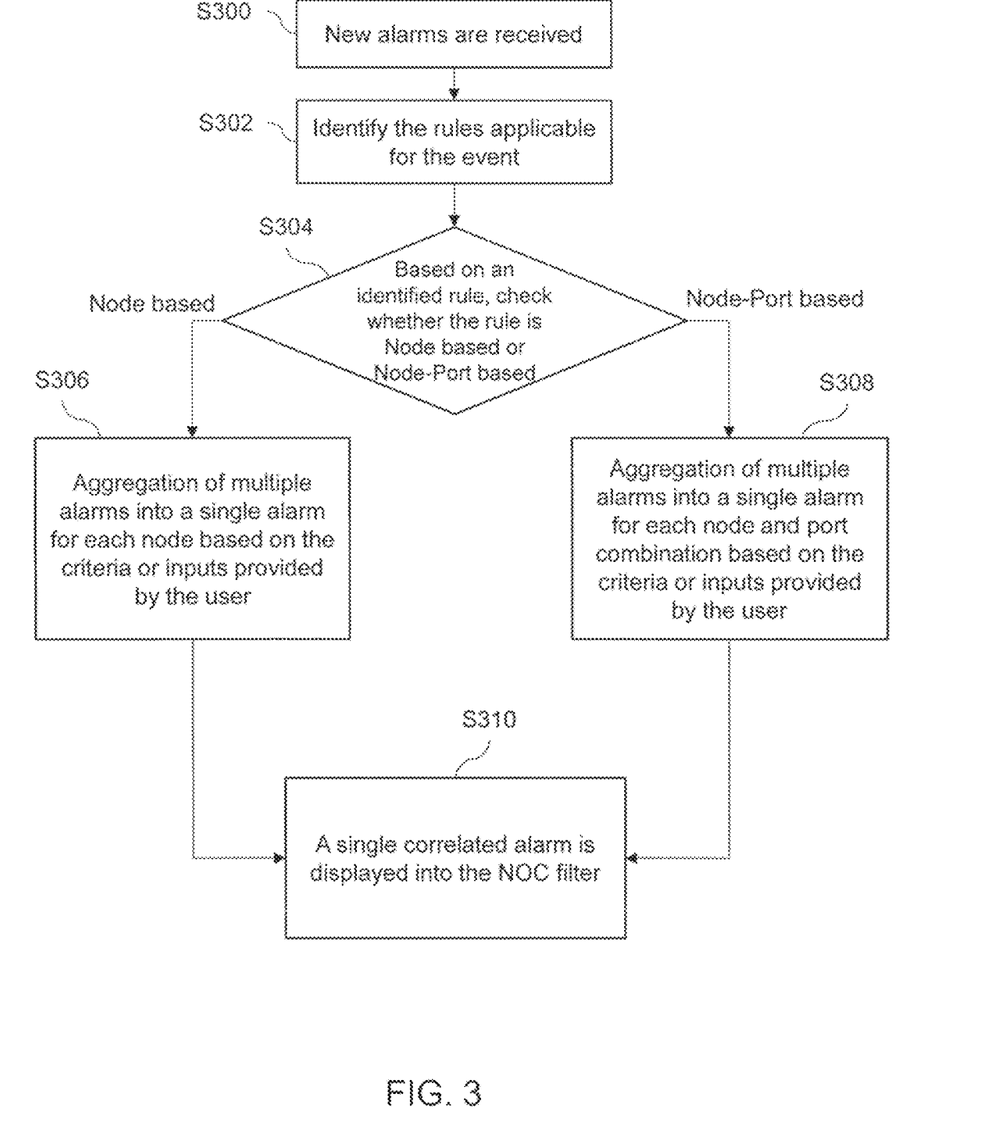
FIG. 3 shows an example process flow for aggregation based correlation.

FIG. 3 shows an example process flow for aggregation based correlation. First, incoming alarms may be received (S300) and at least one rule applicable for the alarm(s)/event(s) may be identified (S302). For example, a new alarm may be received into the fault management system and an aggregation rule applicable for this alarm may be identified based on the alarm type/alert group, severity, class and any other SQL queries (e.g. alarm fields) as defined by the user. This process may be repeated for each alarm received into the system and the alarm may be tagged with a rule name for further processing.

FIG. 6A shows an example GUI that may enable a user to configure an aggregation rule (see also, e.g. element 206 of FIG. 2). The GUI shown in FIG. 6A may allow a user to set a rule name, aggregation type (e.g. Node Based or Node-Port Based), alert group(s) indicating type(s) of alarm(s) which may be comma separated (e.g., instead of providing the types of alarms in different rows, multiple types of alarms may be provided using comma separated; e.g., Sub-Interface Limit, Address Pool Group Utilization, Address Pool Utilization), severity indicating the minimum severity of the alarms which are to be correlated, a class, one or more SQL queries, an alarm threshold number and a time window. The class of alarms may indicate device types or system types the alarm(s) belong to. For example, the class of alarms may relate to systems or vendors where the alarms occurred. Examples of the device types may include, but not be limited to, Cisco, Cisco Defined MIB type, Juniper, and/or Juniper defined MIB type. An example of the system type may be Probe/alarm source system on which the alarm was received. A probe may connect to an event source, detect and acquire event data, and forward the data. The probe may monitor the network management system if any fault is occurred. The probe may forward the data to the fault management system. An SQL query may define further condition(s) to search for alarms to be correlated under this aggregation rule. The alarm threshold number may define a minimum number of alarms received in the system for the correlation to take effect. For example, if the alarm threshold number is set to 10, the correlation under this aggregation rule may take effect in case 10 or more relevant alarms are present in the system. The time window may define a time frame during which alarms to be correlated under this aggregation rule may be received. For example, in case the time window is set to 100 seconds, alarms received within 100 seconds from the receipt of the first alarm among the alarms of the alarm type defined in this aggregation rule may be subject to correlation under this aggregation rule. For more specific example, if the first alarm among the alarms of the specified alarm type was received at 10:00:00 AM and the time window is set to 100 seconds, alarms of the specified alarm type received from 10:00:00 AM to 10:01:40 AM may be correlated under this aggregation rule.

Referring again to FIG. 3, each identified rule may be parsed for its pre-defined condition(s) to enable the correlation. For example, the alarms having the same rule in common, which has been identified in steps S300 and S302 as stated above, may be subject to correlation under the common rule. The common rule may be verified to check whether the rule is a Node Based rule or a Node-Port Based rule (S304). If the rule is of a Node Based (S304; Node based), then all the n alarms belonging to a same node (e.g., device name) may be grouped to form a single Node based synthetic alarm within the time window defined by the rule (S306). In some examples, the correlation may be performed if the number (n) of the alarms within the time window is equal to or greater than the alarm threshold number defined by the rule. A parent ID for each of the node alarms may be updated and only the Synthetic Node based alarm may be displayed into the NOC filter (S310). The parent ID may be a field used after the correlation engine to find the child alarms of the particular parent alarm. The Parent ID may be a combination of attributes such as a serial number of the parent alert and a name of the server. In case of Node-Port based (S304; Node-port based), all the n alarms belonging to the same node-port combination may be grouped to form a single Node-Port based synthetic alarm (S308). In some examples, the n alarms having the same node-port combination may be grouped if these alarms are within the time window defined by the rule and if the number (n) of the alarms within the time window is equal to or greater than the alarm threshold number defined by the rule. Then the single correlated alarm may be visible to the Network Operations User (S310).

In the Network Operation Center, each operator group may be tasked to monitor, for example, faults from a particular geographical area and/or a particular set of device types. Thus, monitoring faults from its own area of responsibility may be critical to each operator group. However, a fault management system may be a tool developed to consolidate all the emanating faults of network into a single system. Accordingly, it may become a tedious task to keep updating the filter SQL conditions to block the alarms from appearing. The Suppression of alarms may be advantageous in such a circumstance. In suppression based correlation, alarms/events coming into the fault management system may be tagged so that a fault is visible to those NOC operating groups filter responsible for monitoring.

Figure 4:
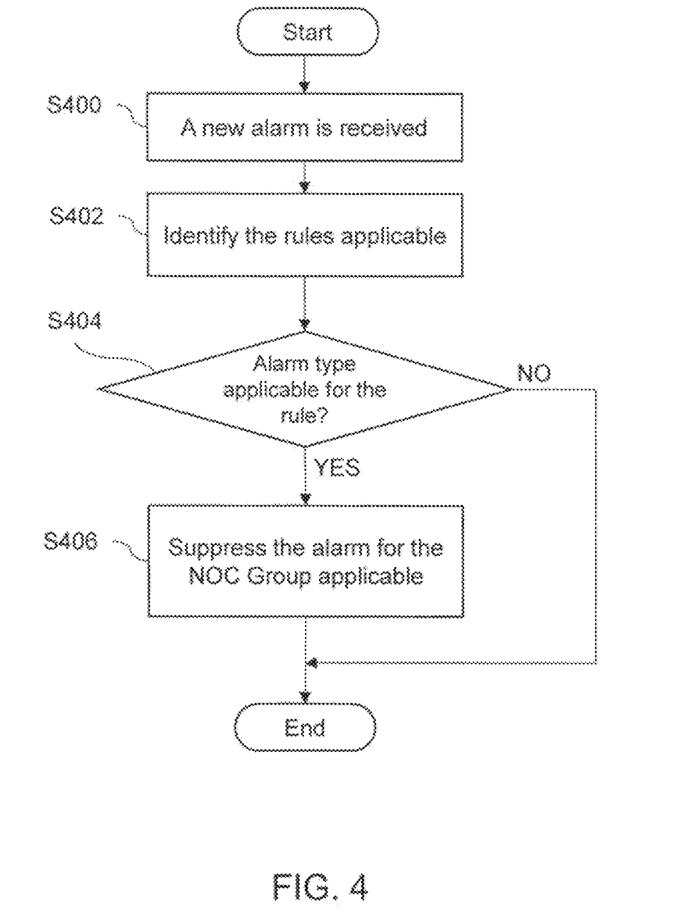
FIG. 4 shows an example process flow for suppression based correlation.

FIG. 4 shows an example process flow for suppression based correlation. First, an incoming alarm may be received (S400) and at least one rule applicable to the received alarm may be identified (S402). For example, a new alarm may be received into the fault management system and a suppression rule applicable for the received alarm type/alert group may be identified. The rule name may then be tagged to the alarm for further processing. The alarms having the same rule in common, which has been identified in steps S400 and S402, may be subject to correlation under the common rule.

FIG. 6B shows an example GUI that may enable a user to configure a suppression rule (see also, e.g. element 206 of FIG. 2). The GUI shown in FIG. 6B may allow a user to set a rule name, one or more alert groups and a suppression user group. The one or more alert groups may indicate one or more alarm type(s). The suppression user group may indicate a user group for which this suppression correlation may take effect. In other words, the alarms of the specified alarm types may be suppressed or made unavailable in the system for the user group specified as the suppression user group.

Referring again to FIG. 4, if the alarm type falls into the category defined in the rule applicable (S404; Yes), then the alarm may be tagged or updated with the Group ID for which it has to be suppressed (S406). For example, based on the user group given by the user as input for suppression, the alarms may be updated with SuppressionGID and those alarms may not be visible in the filter/alarm window/alarm dashboard of the user group specified in the rule. The SuppressionGID may be a flag used after the correlation engine to indicate for which group IDs the alarm is suppressed. Once the alarm has been updated with the SuppressionGrpFlag field, the alarms may be blocked from appearing into the filters of the respective monitoring groups that have requested it to be suppressed. The SuppressionGrpFlag field may be used after the correlation engine to indicate for which groups the alarm is suppressed. If the alarm type does not fall into the category defined in the rule applicable (S404; No), then the processing shown in FIG. 4 may end.

The suppression rule as stated above may be applicable either for a single alarm type or multiple alarm types.

There may be a case where a device goes down and there are flood of alarms into the fault management system which ultimately results in ineffective monitoring. In such a scenario, it may be advantageous to identify the root cause of those faults which led to flood of alarms. The Root Cause Analysis (RCA) correlation may be advantageous in such a circumstance.

Figure 5:
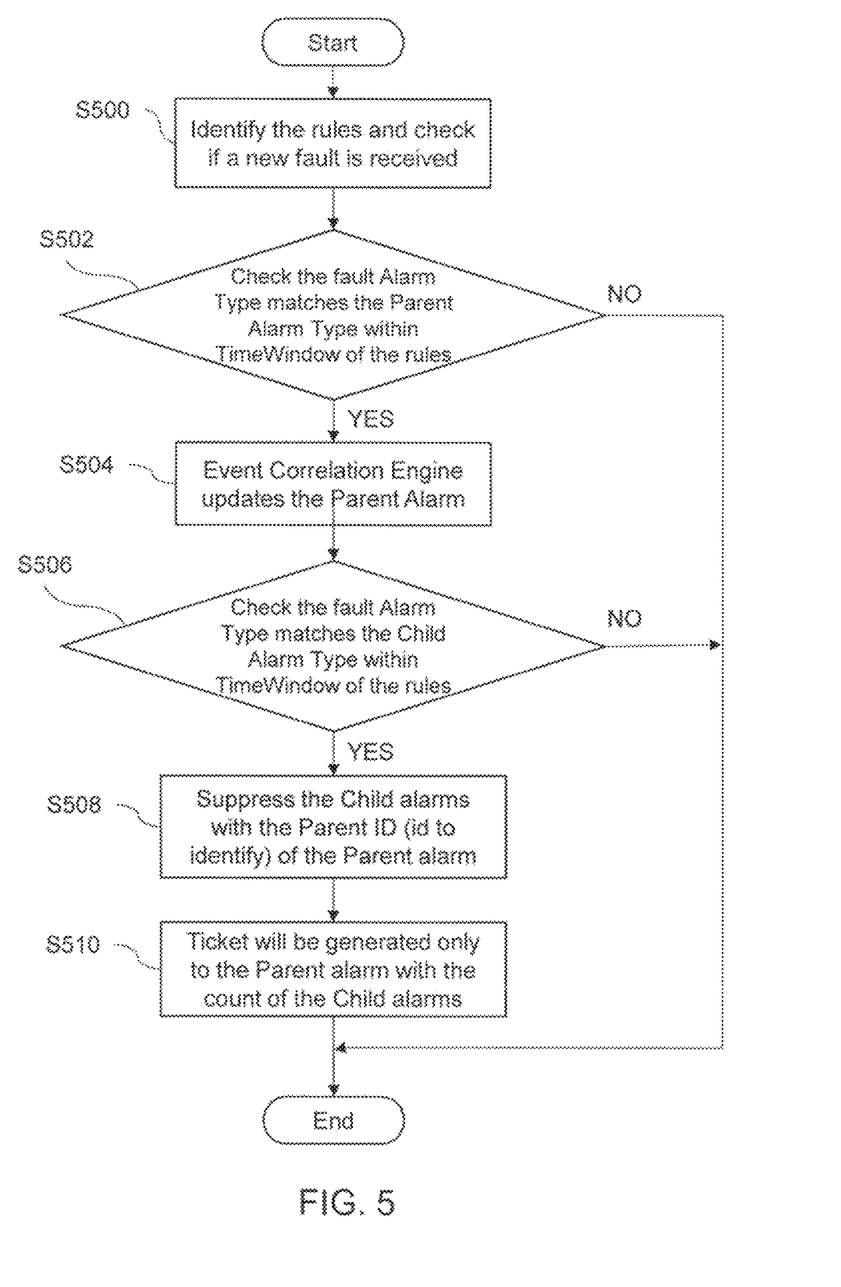
FIG. 5 shows an example process flow for root cause analysis correlation.

FIG. 5 shows an example process flow of Root Cause Analysis. The symptoms or child alarms are tagged or updated with the parent alarm information and the parent alarm itself may be updated with the number of child alarms. For this correlation to be executed, the parent and the child or symptoms alarms may have to be present or available in the fault management system within the time period specified in the rule.

In the example process shown in FIG. 5, first at least one rule may be identified and a determination may be made if a new fault is received (S500). For example, a new parent or child alarm type/alert group may be received into the fault management system. The parent or child alarm type/alert group may relate to a failure type of the alert. The parent alarm type(s) and the child alarm type(s) may be specified by a user. Some specific alarm types may be appropriate as parent alarms and/or child alarms. Further, for example, one or more Root Cause Analysis rules applicable for the alarm may be identified and the rule name(s) may be tagged with the alarm for further processing.

FIG. 6C shows an example GUI that may enable a user to configure a root cause analysis rule (see also, e.g. element 206 of FIG. 2). The GUI shown in FIG. 6C may allow a user to set a rule name, a parent alert group (e.g., a module status), one or more child alert groups (e.g., BGP Peer Status, OSPF Sham-Link Status, Level1 IS Adjacency Status), a before time window and an after time window. Alarms with the specified child alarm type(s) received within the time frame specified by the "before time window" before the receipt of an alarm with the specified parent alarm type and alarms with the specified child alarm type(s) received within the time frame specified by the "after time window" after the receipt of the alarm with the specified parent alarm type may be correlated under this root cause analysis rule. For instance, in case the before time window and the after time window are both set to 100 seconds and the alarm of the specified parent alarm type was received at 10:00:00 AM, alarms received between 09:58:20 AM (10: 00:00 AM-100 seconds (before time window)) and 10:01:40 AM (10:00:00 AM+100 seconds (after time window)) may be subject to correlation under this root cause analysis rule.

Referring again to FIG. 5, a determination may be made as to whether a fault alarm type matches a parent alarm type within a time window of the at least one rule (S502). For example, it may be determined whether the alarm type identified above for the rule is of Parent Alarm Type/Alert Group. If there is a match (S502; YES), the event correlation engine may update the parent alarm (S504). For example, after the correlation, the parent ID may be updated so that the parent and child alarms can be identified. For example, the alarm and the parent alarm type or alert group may be tagged. If there is no match (S502; NO), the process may end. After the parent alarm is updated, a determination may be made as to whether the fault alarm type matches the child alarm type within the time window of the at least one rule (S506). For example, the alarm type(s)/alert group(s) which are of child alarm type(s)/alert group(s) may be checked. The identification of child alarm type(s)/alert group(s) that may be related to the parent alarm may be performed using topological information. The topological information may be fetched from the inventory system. The topological information may indicate, for example, for the parent node, what are the adjacent (child) nodes connected in a network. Although child alarm types may be already specified by the user, the topological information may provide for a particular parent node what are the child node alert types of the alarms that have been received in the topology. In particular circumstances, the process may end if there is no match at step S506 (e.g. S506; NO). If there is a match at step S506 (S506; YES), the child alarms may be suppressed with the parent ID of the parent alarm (S508) and a ticket may be generated only to the parent alarm with the count of the child alarms (S510). For example, once the complete set of parent and child alarms are identified, a determination may be made as to whether the child alarms are present within the time window specified (e.g., between the before time window and after time window). If yes, the child alarm(s) may be tagged with the identification of the parent alarm (e.g. the serial number of the parent alarm) and the severity of the child alarm(s) may be suppressed (to e.g. informational or warning). Then, only for the Parent alarm the request for ticket may be processed into the Ticket System. The Ticket System may be an issue tracking system which may help the customers to know the status, owner and the timeline to resolve the issue. Based on this, a field engineer may troubleshoot the issue. The process shown in FIG. 5 may end after step S510.

According to a root cause analysis rule, correlation between one or more alarms and a type of fault which causes the one or more alarms may be performed. For example, suppose that a device A sends an alarm when the node or device is unreachable or shutdown. Correspondingly, all the interfaces/ports and/or components which are active in the device may also send alarms into the fault management system. Further, the devices which are topologically connected to the device A through the interfaces/ports may send alarms into the fault management system since their respective interfaces/ports may be down. In such a case, the device A may be considered as the root cause and all the other devices may flood alarms into the fault management system. In order to build a correlation among those alarms, the Root Cause Analysis correlation framework may be employed. For example, correlation can be done based on the parent and child alarm types entered by the user. If the alarm exists in the fault management system, the topological information may be checked for the parent and the child node alarms may be fetched for suppression. The ticket may be generated only for the parent alarm so that the end user may come to know that all child alarms have been generated because of the parent alarm. This may help field engineer to quickly find and resolve the issue.

The On-Demand Correlation Framework may provide a user with a GUI Page. The user may have the option of selecting the kind of correlation the user wants to execute. The three options provided may be Aggregation, Suppression and Root Cause Analysis. Each of the correlation inputs provided by the user may be updated to the database where the inputs may be stored as a single rule. The alarm correlation engine may regularly poll this database table where the user defined rules may be present and in an enabled state. For each rule that has been enabled, the correlation engine may check for the alarms applicable to that particular rule in the fault management system repository. The alarm that qualify the rule criteria may be copied into a temporary alarm database and tagged with the rule name applicable. Once all the qualified alarms for a particular rule is present in the temporary alarm database, the logic applicable for the rule may be applied.

If the rule is of Aggregation type, a single correlated Aggregate alarm may be inserted into the fault management system having the highest severity applicable among the alarms that were correlated with. The applicable filter for the operations user may have this single correlated alarm.

If the rule is of Suppression type, all the correlated alarms may be moved out of the monitoring filter of the operation user. Thus, the user may not have to repeatedly ask for change request to the developer to implement the monitoring filter.

If the rule is of Root Cause Analysis (RCA), the parent alarm that is the cause of the fault may be notified into the operations user monitoring filter and that particular alarm may only be eligible for ticketing and/or the next best course of action to be taken by the operator.

Figure 7:
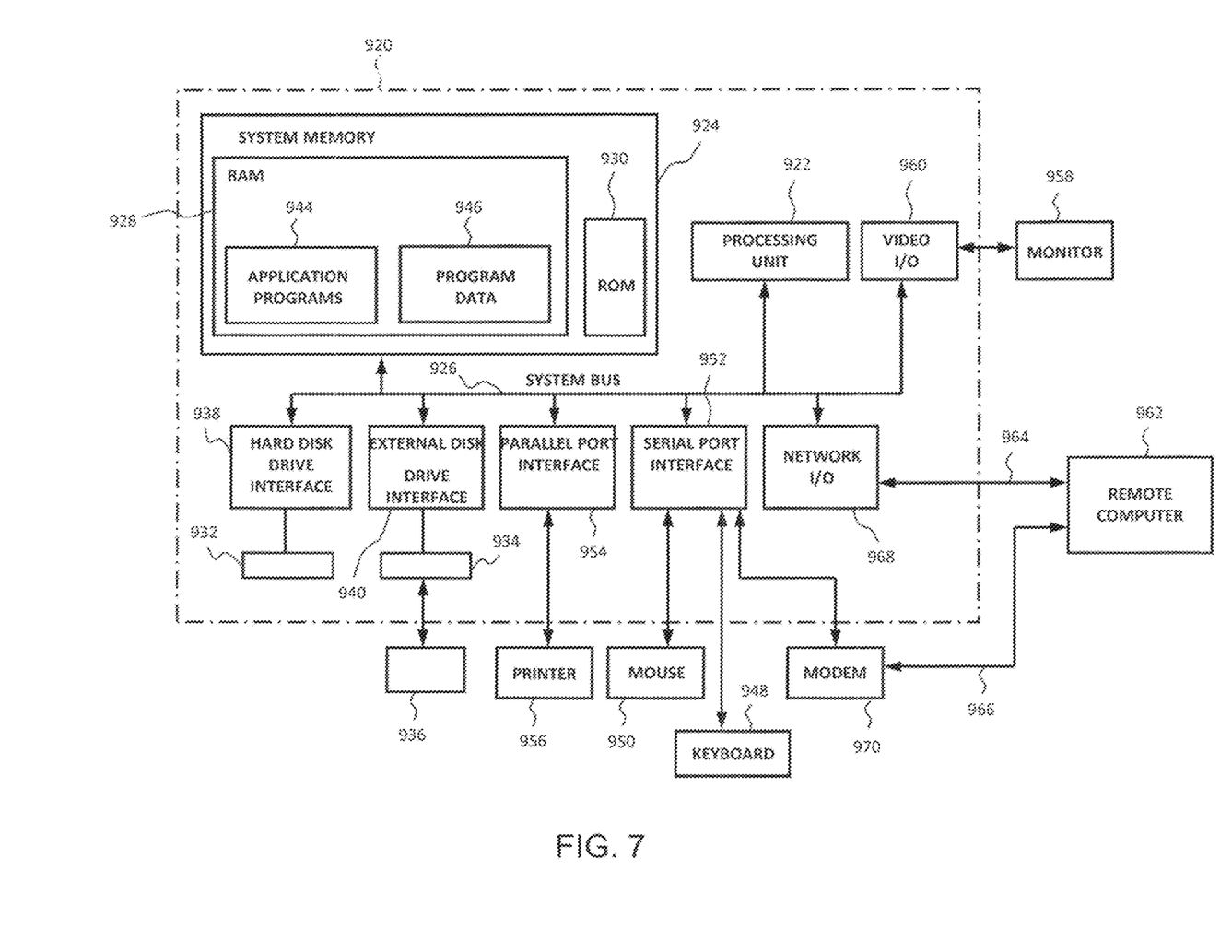
FIG. 7 shows an example system including a computing device in the form of a computing environment.

FIG. 7 shows an example system for implementing the various embodiments and examples described herein, including a computing device in the form of a computing environment 920 (e.g. a personal computer). The computing environment includes a processing unit 922, a system memory 924, and a system bus 926. The system bus couples various system components including the system memory 924 to the processing unit 922. The processing unit 922 may perform arithmetic, logic and/or control operations by accessing the system memory 924. The system memory 924 may store information and/or instructions for use in combination with the processing unit 922. The system memory 924 may include volatile and non-volatile memory, such as a random access memory (RAM) 928 and a read only memory (ROM) 930. A basic input/output system (BIOS) containing the basic routines that helps to transfer information between elements within the personal computer 920, such as during start-up, may be stored in the ROM 930. The system bus 926 may be any of several types of bus structures including a memory bus or memory controller, a peripheral bus, and a local bus using any of a variety of bus architectures.

The personal computer 920 may further include a hard disk drive 932 for reading from and writing to a hard disk (not shown), and an external disk drive 934 for reading from or writing to a removable disk 936. The removable disk may be a magnetic disk for a magnetic disk driver or an optical disk such as a CD ROM for an optical disk drive. The hard disk drive 932 and the external disk drive 934 are connected to the system bus 926 by a hard disk drive interface 938 and an external disk drive interface 940, respectively. The drives and their associated computer-readable media provide nonvolatile storage of computer readable instructions, data structures, program modules and other data for the personal computer 920. The data structures may include relevant data for the implementation of the method as described above. The relevant data may be organized in a database, for example a relational database management system or an object-oriented database management system.

Although the example environment described herein employs a hard disk (not shown) and an external disk 936, it should be appreciated by those skilled in the art that other types of computer readable media which can store data that is accessible by a computer, such as magnetic cassettes, flash memory cards, digital video disks, random access memories, read only memories, and the like, may also be used in the example operating environment.

A number of program modules may be stored on the hard disk, external disk 936, ROM 930 or RAM 928, including an operating system (not shown), one or more application programs 944, other program modules (not shown), and program data 946. The application programs may include at least a part of the functionality as depicted in FIGS. 1-5.

A user may enter commands and information, as discussed below, into the personal computer 920 through input devices such as keyboard 948 and mouse 950. Other input devices (not shown) may include a microphone (or other sensors), joystick, game pad, scanner, or the like. These and other input devices may be connected to the processing unit 922 through a serial port interface 952 that is coupled to the system bus 926, or may be collected by other interfaces, such as a parallel port interface 954, game port or a universal serial bus (USB). Further, information may be printed using printer 956. The printer 956, and other parallel input/output devices may be connected to the processing unit 922 through parallel port interface 954. A monitor 958 or other type of display device is also connected to the system bus 926 via an interface, such as a video input/output 960. In addition to the monitor, computing environment 920 may include other peripheral output devices (not shown), such as speakers or other audible output.

The computing environment 920 may communicate with other electronic devices such as a computer, telephone (wired or wireless), personal digital assistant, television, or the like. To communicate, the computer environment 920 may operate in a networked environment using connections to one or more electronic devices. FIG. 9 depicts the computer environment networked with remote computer 962. The remote computer 962 may be another computing environment such as a server, a router, a network PC, a peer device or other common network node, and may include many or all of the elements described above relative to the computing environment 920. The logical connections depicted in FIG. 9 include a local area network (LAN) 964 and a wide area network (WAN) 966. Such networking environments are commonplace in offices, enterprise-wide computer networks, intranets and the Internet and may particularly be encrypted.

When used in a LAN networking environment, the computing environment 920 may be connected to the LAN 964 through a network I/O 968. When used in a WAN networking environment, the computing environment 920 may include a modem 970 or other means for establishing communications over the WAN 966. The modem 970, which may be internal or external to computing environment 920, is connected to the system bus 926 via the serial port interface 952. In a networked environment, program modules depicted relative to the computing environment 920, or portions thereof, may be stored in a remote memory storage device resident on or accessible to remote computer 962. Furthermore other data relevant to the method for optimization of evaluation of a policy (described above) may be resident on or accessible via the remote computer 962. It will be appreciated that the network connections shown are example and other means of establishing a communications link between the electronic devices may be used.

The above-described computing system is only one example of the type of computing system that may be used to implement the method and/or system according to various aspects and examples described herein.

The foregoing disclosure provides illustration and description, but is not intended to be exhaustive or to limit the implementations to the precise form disclosed. Modifications and variations are possible in light of the above disclosure or may be acquired from practice of the implementations.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A computer-implemented method, the computer-implemented method comprising:
    presenting, on a display device, a graphical user interface that allows a user to select a type of correlation between one or more alarms and a type of fault which causes the one or more alarms from among a plurality of types of correlation,
        wherein the plurality of types of correlation includes a root cause analysis correlation where a parent alarm is determined to be presented for display while one or more child alarms of the parent alarm are determined to be suppressed;
    receiving, via the graphical user interface, a user input indicating the root cause analysis correlation selected by the user;
    storing, in a database, at least one rule based on the root cause analysis correlation selected by the user,
        the at least one rule specifying that receipt of the parent alarm causes suppression of the one or more child alarms that are received within one or more time windows associated with the receipt of the parent alarm;
    receiving, by a server, a plurality of alarms generated with relation to a computer network;
    correlating, by a correlation engine, the plurality of alarms received by the server according to the at least one rule stored in the database to identify a fault which has caused the one or more alarms;
    identifying, among the at least one rule stored in the database, one or more rules applicable for the plurality of alarms received by the server;
    determining, if an alarm type of one of the plurality of alarms received by the server falls into a category defined in the one or more identified rules, one of the plurality of alarms received by the server to be suppressed; and
    providing, for presentation on the display device, information regarding the fault.

2. The computer-implemented method according to claim 1, further comprising:
    based on the correlation engine identifying the fault, transmitting a signal to rectify the fault.

3. The computer-implemented method according to claim 1, further comprising:
    generating the at least one rule based on the type of correlation selected by the user.

4. The computer-implemented method according to claim 1, wherein the plurality of types of correlation includes one or more of:
    an aggregation based correlation where two or more alarms are aggregated into a single alarm for a node in the computer network or for a combination of a node and a port in the computer network; or
    a suppression based correlation where one or more alarms are determined to be suppressed.

5. The computer-implemented method according to claim 1, further comprising:
    determining, based on the one or more identified rules, whether the one or more identified rules are of Node based or of Node-Port based; and
    if the one or more identified rules are of Node based, aggregating all alarms belonging to a same node of the computer network to form a single alarm; or
    if the one or more identified rules are of Node-Port based, aggregating all alarms belonging to a same combination of a node and a port to form the single alarm.

6. The computer-implemented method according to claim 1, wherein the graphical user interface includes a dropdown menu showing the plurality of types of correlation for user selection.

7. The computer-implemented method according to claim 1, further comprising:
    providing, for presentation on the display device, an input form based on the type of correlation selected by the user, the input form allowing the user to enter correlation parameters required for execution of the type of correlation; and
    receiving the correlation parameters required for execution of the type of correlation and entered by the user.

8. A correlation system, the correlation system comprising:
    a database; and
    one or more processors to:
        present, on a display device, a graphical user interface that allows a user to select a type of correlation between one or more alarms and a type of fault which causes the one or more alarms from among a plurality of types of correlation,
            wherein the type of correlation includes a root cause analysis correlation where a parent alarm is determined to be presented for display while one or more child alarms of the parent alarm are determined to be suppressed;
        receive, via the graphical user interface, a user input indicating the root cause analysis correlation selected by the user;
        store, in the database, at least one rule based on the root cause analysis correlation selected by the user,
            the at least one rule specifying that receipt of the parent alarm causes suppression of the one or more child alarms that are received within one or more time windows associated with the receipt of the parent alarm;
        receive, by a server, a plurality of alarms generated with relation to a computer network;
        correlate, by a correlating engine, the plurality of alarms according to the at least one rule stored in the database to identify a fault which has caused the one or more alarms;
        identify, among the at least one rule stored in the database, one or more rules applicable for the plurality of alarms received by the server;
        determining, if an alarm type of one of the plurality of alarms received by the server falls into a category defined in the one or more identified rules, one of the plurality of alarms received by the server to be suppressed; and
        provide, for presentation on the display device, information regarding the fault.

9. A non-transitory computer-readable medium storing one or more instructions, the one or more instructions comprising:
    one or more instructions that, when executed by one or more processors of a correlation system cause the one or more processors to:
        present, on a display device, a graphical user interface that allows a user to select a type of correlation between one or more alarms and a type of fault which causes the one or more alarms from among a plurality of types of correlation,
  wherein the type of correlation includes a root cause analysis correlation where a parent alarm is determined to be presented for display while one or more child alarms of the parent alarm are determined to be suppressed;
receive, via the graphical user interface, a user input indicating the root cause analysis correlation selected by the user;
store, in a database, at least one rule based on the root cause analysis correlation selected by the user,
  the at least one rule specifying that receipt of the parent alarm causes suppression of the one or more child alarms that are received within one or more time windows associated with the receipt of the parent alarm;
receive, by a server, a plurality of alarms generated with relation to a computer network;
correlate, by a correlating engine, the plurality of alarms according to the at least one rule stored in the database to identify a fault which has caused the one or more alarms;
identify, among the at least one rule stored in the database, one or more rules applicable for the plurality of alarms received by the server;
determine, if an alarm type of one of the plurality of alarms received by the server falls into a category defined in the one or more identified rules, one of the plurality of alarms received by the server to be suppressed; and
provide, for presentation on the display device, information regarding the fault.

10. A graphical user interface for correlating alarms that are generated with relation to a computer network, wherein the alarms represent faults of the computer network and/or faults of components of the computer network, the graphical user interface comprising:
  information that allows a user to select a type of correlation between one or more alarms and a type of fault which causes the one or more alarms from among a plurality of types of correlation,
    wherein the plurality of types of correlation includes a root cause analysis correlation where a parent alarm is determined to be presented for display while one or more child alarms of the parent alarm are determined to be suppressed;
  information that indicates that the root cause analysis correlation has been selected by the user;
  information that causes, based on the root cause analysis correlation being selected by the user, at least one rule to be stored in a database,
    the at least one rule specifying that receipt of the parent alarm causes suppression of the one or more child alarms that are received within one or more time windows associated with the receipt of the parent alarm;
  information indicating that a server has received a plurality of alarms generated with relation to the computer network;
  information indicating that a correlation engine has correlated the plurality of alarms received by the server, the plurality of alarms having been correlated according to the at least one rule stored in the database to identify a fault which has caused the plurality of alarms;
  information identifying, among the at least one rule stored in the database, one or more rules applicable for the plurality of alarms received by the server;
  if an alarm type of one of the plurality of alarms received by the server falls into a category defined in the one or more identified rules, information indicating said one of the plurality of alarms received by the server to be suppressed; and
  information enabling presentation of information regarding the fault.

11. The correlation system of claim 8, wherein the one or more processors are further to:
  transmit, based on the correlation engine identifying the fault, a signal to rectify the fault.

12. The correlation system of claim 8, wherein the one or more processors are further to:
  generate, based on the type of correlation selected by the user, the at least one rule.

13. The correlation system of claim 8, wherein the one or more processors are further to receive a user input indicating a selection, by the user, of one or more of:
  an aggregation based correlation where two or more alarms are aggregated into a single alarm for a node in the computer network or for a combination of a node and a port in the computer network; or
  a suppression based correlation where one or more alarms are determined to be suppressed.

14. The correlation system of claim 8, wherein the one or more processors are further to:
  determine, based on the one or more identified rules, whether the one or more identified rules are of Node based or of Node-Port based; and
  if the one or more identified rules are of Node based, aggregate all alarms belonging to a same node of the computer network to form a single alarm; or
  if the one or more identified rules are of Node-Port based, aggregate all alarms belonging to a same combination of a node and a port to form the single alarm.

15. The non-transitory computer-readable medium of claim 9, wherein the one or more instructions, when executed by the one or more processors, further cause the one or more processors to:
  transmit, based on the correlation engine identifying the fault, a signal to rectify the fault.

16. The non-transitory computer-readable medium of claim 9, wherein the one or more instructions, when executed by the one or more processors, further cause the one or more processors to:
  generate, based on the type of correlation selected by the user, the at least one rule.

17. The non-transitory computer-readable medium of claim 9, wherein the one or more instructions, when executed by the one or more processors, further cause the one or more processors to:
  receive another user input indicating a selection, by the user, of one or more of:
    an aggregation based correlation where two or more alarms are aggregated into a single alarm for a node in the computer network or for a combination of a node and a port in the computer network; or
    a suppression based correlation where one or more alarms are determined to be suppressed.

18. The non-transitory computer-readable medium of claim 9, wherein the one or more instructions, when executed by the one or more processors, further cause the one or more processors to:
- determine, based on the one or more identified rules, whether the one or more identified rules are of Node based or of Node-Port based; and
- if the one or more identified rules are of Node based, aggregate all alarms belonging to a same node of the computer network to form a single alarm; or
- if the one or more identified rules are of Node-Port based, aggregate all alarms belonging to a same combination of a node and a port to form the single alarm.

19. The non-transitory computer-readable medium of claim 9, wherein the one or more instructions, when executed by the one or more processors, further cause the one or more processors to:
- provide, for presentation on the display device, an input form based on the type of correlation selected by the user, the input form allowing the user to enter correlation parameters required for execution of the type of correlation; and
- receive the correlation parameters required for execution of the type of correlation and entered by the user.

20. The correlation system of claim 8, wherein the one or more processors are further to:
- provide, for presentation on the display device, an input form based on the type of correlation selected by the user, the input form allowing the user to enter correlation parameters required for execution of the type of correlation; and
- receive the correlation parameters required for execution of the type of correlation and entered by the user.

* * * * *